US 6,599,024 B2

(12) United States Patent
Zimmel

(10) Patent No.: US 6,599,024 B2
(45) Date of Patent: Jul. 29, 2003

(54) FIBER OPTIC ADAPTER WITH ATTENUATOR AND METHOD

(75) Inventor: Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/264,531

(22) Filed: Oct. 4, 2002

(65) Prior Publication Data
US 2003/0031423 A1 Feb. 13, 2003

Related U.S. Application Data

(63) Continuation of application No. 09/833,100, filed on Apr. 11, 2001.

(51) Int. Cl.⁷ .............................. G02B 6/36; G02B 6/38
(52) U.S. Cl. ........................................ 385/73; 385/140
(58) Field of Search ............................ 385/73, 140, 74, 385/53, 55, 70

(56) References Cited

U.S. PATENT DOCUMENTS

| 4,255,016 A | * | 3/1981 | Borsuk ........................ 385/73 |
| 4,707,068 A | * | 11/1987 | Moulin ........................ 385/72 |
| 4,717,234 A | | 1/1988 | Barlow et al. ............... 385/140 |
| 4,753,511 A | | 6/1988 | Bowers et al. ............ 350/96.21 |
| 4,878,730 A | | 11/1989 | Wall ............................. 385/140 |
| 4,900,124 A | | 2/1990 | Lampert et al. ......... 350/96.15 |
| 4,989,938 A | | 2/1991 | Tamulevich ............. 350/96.15 |
| 5,031,994 A | | 7/1991 | Emmons ..................... 350/96.2 |
| 5,067,783 A | | 11/1991 | Lampert ....................... 385/60 |
| 5,082,345 A | | 1/1992 | Cammons et al. ............ 385/60 |
| 5,109,468 A | | 4/1992 | Tamulevich et al. ........ 385/140 |
| 5,274,729 A | | 12/1993 | King et al. .................. 385/134 |
| 5,317,663 A | | 5/1994 | Beard et al. ................... 385/70 |
| 5,319,733 A | | 6/1994 | Emmons et al. ............ 385/140 |
| 5,588,087 A | | 12/1996 | Emmons et al. ............ 385/140 |
| 5,883,995 A | | 3/1999 | Lu ................................. 385/60 |
| 6,097,873 A | | 8/2000 | Filas et al. .................. 385/140 |
| 6,104,856 A | | 8/2000 | Lampert ...................... 385/140 |
| 6,188,827 B1 | * | 2/2001 | Stephenson ................. 385/140 |
| 6,220,763 B1 | | 4/2001 | Stephenson .................. 385/73 |
| 6,275,643 B1 | * | 8/2001 | Bandy et al. ............... 385/140 |

FOREIGN PATENT DOCUMENTS

| EP | 0 581 527 A1 | 2/1994 |
| EP | 1 041 413 A1 | 10/2000 |
| EP | 1 041 415 A1 | 10/2000 |
| WO | WO 00/31575 | 6/2000 |

* cited by examiner

Primary Examiner—Michael C. Zarroli
(74) Attorney, Agent, or Firm—Merchant & Gould PC

(57) ABSTRACT

The present invention relates to a fiber optic device for the optically connecting optical fiber. The device consists of fiber optic connectors holding the terminal ends of optical fiber in ferrules and an adapter for receiving fiber optic connectors. The adapter includes a sleeve within a longitudinal opening which aligns the ferrules and the terminal end of the optical fiber held by the ferrules. Within the sleeve is placed an attenuator which extends across the longitudinal opening in the sleeve and is held at an angle to the longitudinal axis of the opening by slots in the sidewall of the sleeve. The angle at which the attenuator is held may be perpendicular or non-perpendicular to the longitudinal axis of the sleeve. The sleeve is further prevented from rotating within the adapter by pockets formed in the inner wall of the longitudinal opening engaging extensions of the attenuator beyond the sidewall of the sleeve. The adapter with a non-rotating sleeve and attenuator is disclosed to be adapted for use with a variety of formats of fiber optic connectors. The attenuator may be held within the adapter perpendicular to the longitudinal axis of the sleeve for use with PC, SPC, UPC or other ferrule ends, or for use with flat, perpendicular ferrule ends. The attenuator may also be held at non-perpendicular angles to the longitudinal axis of the sleeve, for use with angled flat ferrules, such as APC ferrules.

8 Claims, 11 Drawing Sheets

FIBER OPTIC ADAPTER WITH ATTENUATOR AND METHOD

This application is a continuation of application Ser. No. 09/833,100, filed Apr. 11, 2001, which application(s) are incorporated herein by reference.

FIELD OF THE INVENTION

This invention relates to connectors and adapters for optical fibers. More particularly, this invention relates to adapters which provide attenuation in addition to optically connecting the terminal ends of optical fiber held by a pair of optical fiber connectors.

BACKGROUND OF THE INVENTION

A wide variety of optical fiber connectors and corresponding adapters are known for the connecting of optical fiber. Many of these are industry standards and others are proprietary in nature. Regardless of the design, these connector/adapter combinations accomplish the same basic function: aligning two terminal ends of optical fiber to come into optical contact with one another and allow light passing through one fiber to be transmitted to the other fiber.

In many instances, an attenuation effect is needed in the optical pathway. It is known to have an attenuator held within the adapter to provide attenuation in the optical pathway between the two optical fiber connectors. Fiber optic attenuators induce a calibrated fixed loss between two connectors, which dampens (attenuates) the fiber optic signal. Attenuation is needed when an optical signal has too much power and exceeds the operating range of the equipment being connected. Without attenuation, the result can be saturation of the signal and induction of system errors or failures.

Attenuation within optical fiber networks can be achieved in several ways. Since bends in the optical fiber cable can cause some attenuation, it is known to provide a block for creating artificial bends in an optical fiber cable. Alternatively, an attenuator can be spliced into the optical fiber cable itself. Another option is to have attenuation built into an in-line device.

Fiber optic connection systems often will include a split sleeve within the adapter. The split sleeve is sized and positioned to receive the ferrules containing the terminal ends of optical fibers of each of a pair of fiber optic connectors. The split sleeve functions to hold these ferrules and the terminal fiber ends so that the ends are aligned and permit the optical connection of the cables attached to these connectors. The terminal end of each of the optical fibers are typically held in physical contact with one another to ensure the optical connection does not adversely affect the magnitude and accuracy of the signal being carried by the optical fiber.

It is known to interpose an attenuation medium between the terminal ends of the optical fiber to achieve a desired level of signal attenuation. U.S. Pat. Nos. 4,717,234 and 5,082,345 disclose connector and adapter combinations that provide an attenuator situated between the respective terminal ends of optical fiber and in physical contact with the terminal ends. Further, attenuators are desired for attenuating the signal between the terminal ends of the fibers to address such concerns as ease of assembly, ease of use, and availability for use with terminal ends which are angled.

SUMMARY OF THE INVENTION

One aspect of the invention relates to a fiber optic device for optically connecting fiber optic cables including an adapter for receiving fiber optic connectors which are attached to fiber optic telecommunications cables. The fiber optic connectors include ferrules which hold the terminal ends of the optical fiber of the optical cable. The fiber optic adapter includes a housing which forms a longitudinal opening through the adapter. Held within the longitudinal opening of the adapter is a fiber coupling mechanism including a hollow sleeve for receiving the ferrules and the terminal ends of the optical fiber of the connectors and aligning the optical fibers. In this sleeve are slots on opposite sides for placing an attenuator across the sleeve between the terminal ends of the optical fiber. This attenuator extends beyond the outer wall of the sleeve to engage pockets in the inner wall of the longitudinal opening, thus preventing the attenuator and sleeve from rotating within the longitudinal opening.

The slots in the sleeve may be directly across from each other to hold the attenuator perpendicular to the longitudinal axis of the sleeve. Alternatively the slots may be offset longitudinally to hold the attenuator at a non-perpendicular angle to the longitudinal axis of the sleeve, such as about 8 degrees from perpendicular for use with an angled physical contact (APC) connector.

A further aspect of the invention is to provide the fiber optic adapter described above without the optical fiber connectors. This adapter includes a housing forming a longitudinal opening through the adapter, a sleeve positioned within the longitudinal opening, and an attenuator inserted through the sleeve, extending beyond the outer wall of the sleeve and engaging pockets formed in the inner wall of the longitudinal opening, thus preventing the sleeve from rotating within the longitudinal opening. The slots in the sleeve of this adapter may be placed directly opposite each other across the sleeve to hold the attenuator at an angle perpendicular to the longitudinal axis of the sleeve. Alternatively, the slots in the sleeve may be longitudinally offset from each other so as to hold the attenuator at a non-perpendicular angle to the longitudinal axis of the sleeve, such as at an angle of 8 degrees for use with APC connectors.

A further aspect of this invention is method of assembling a fiber optic housing forming a longitudinal opening through the adapter with a sleeve placed within the longitudinal opening and an attenuator inserted through slots in the sleeve and extending across the longitudinal opening.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows.

DETAILED DESCRIPTION OF THE PREFERRED EMBODIMENTS

Figure 1:
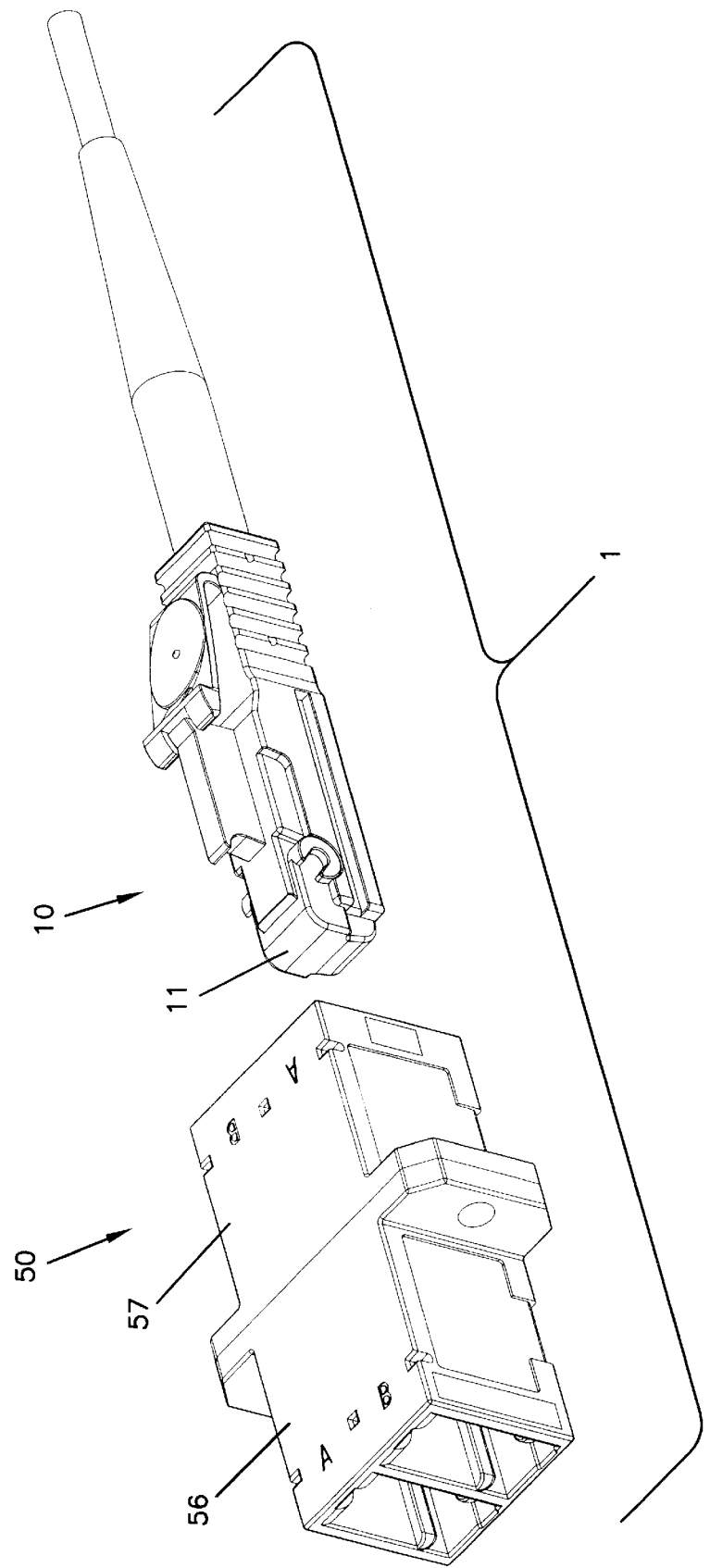
FIG. 1 is a perspective view of a first embodiment of a fiber optic connector and adapter with attenuator with the connector in position to be inserted into the adapter.
Figure 2:
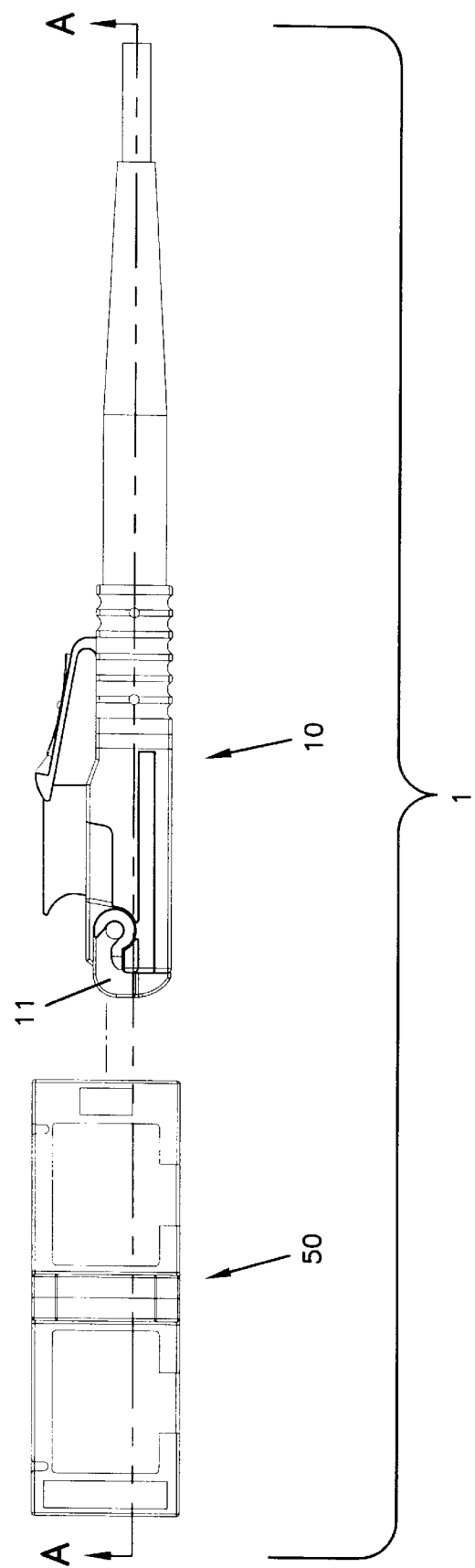
FIG. 2 is side view of the adapter and connector shown in FIG. 1.
Figure 3:
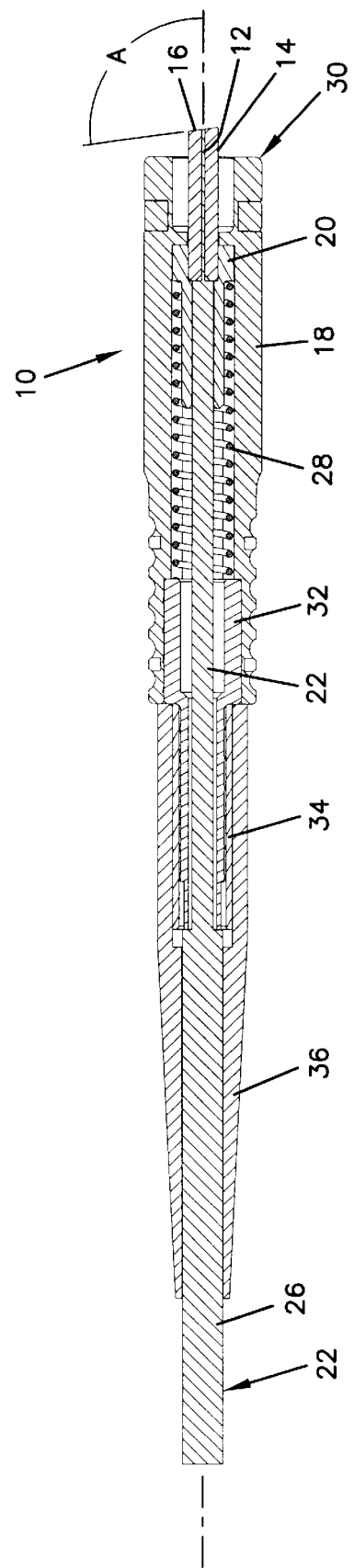
FIG. 3 shows a cross-sectional view of the connector of FIG. 2 with the cap removed, taken along line AA, showing an angled planar end polish.

Referring now to the FIGS. 1–10, a first preferred embodiment of the present invention is shown. In FIG. 1, an optical fiber connector 10 is shown in position for insertion into a adapter 50. When connected, optical fiber connector 10 and adapter 50 form an assembly 1. A second fiber optic connector, not shown in this drawing, would be inserted in the opposing opening to form an optical connection between the optical fiber held by the two connectors. Adapter 50 is capable of holding two pairs of connectors in such a fashion. Protective cap 11 is shown covering the end of connector 10. Protective cap 11 pivotably moves from the shown closed position to an open position exposing the end of fiber ferrule 14 when connector 10 is inserted into adapter 50. When connector 10 is removed from adapter 50, protective cap 11 pivotably moves from an open position to the closed position as shown in FIG. 1, to prevent inadvertent exposure to light from the fiber and to protect the internal components of connector 10 from contamination. FIG. 3 shows a cross-section of fiber optic connector 10, and optical fiber 12 held by connector 10. Protective cap 11 has been removed in this drawing. Connector 10 includes a fiber ferrule 14, the end of which coincides with the end of optical fiber 12 at polished face 16. The profile of polished face 16 in this embodiment conforms to the industry standard for angled physical contact (APC) connections. Further details of an APC connection are provided below. Alternative embodiments might include other known polish profiles such as flat polish, physical contact (PC), super physical contact (SPC), ultra physical contact (UPC), or other profiles designed to facilitate the creation of an optical connection between the optical fiber of two connectors. Adapter 50 is an in-line receptable for optical fibers cables and may be adapted to be mounted on a bulkhead or panel, or within other devices.

Ferrule 14 is held within connector housing 18 by hub 20. Hub 20 fixedly receives a portion of optical fiber cable 22, typically just the inner cladding 24 and the optical fiber 12 in its first end and only allows bare optical fiber 12 to exit the opposite end. Optical fiber cable 22 also includes an outer cladding 26 which surrounds and protects inner cladding 24. A spring 28 within connector housing 18 acts to bias hub 20, optical fiber 12 and inner cladding 24 toward end 30 of connector 10, end 30 being the end of connector 10 inserted into adapter 50. A mandrel 32 and crimp 34 operate to clamp inner cladding 24 and fix optical fiber cable 22 to connector 10. Strain relief boot 36 surrounds the ends mandrel 32 and crimp 34 where they exit from connector 10 and extends along optical fiber cable 22 away from connector 10. Aspects of the adapter/connector combination shown in the first preferred embodiment of the present invention is described more fully in U.S. Pat. No. 5,883,995, the disclosure of which is incorporated herein by reference. Adapter 50 differs with respect to the attenuator feature, as will be described below.

Figure 4:
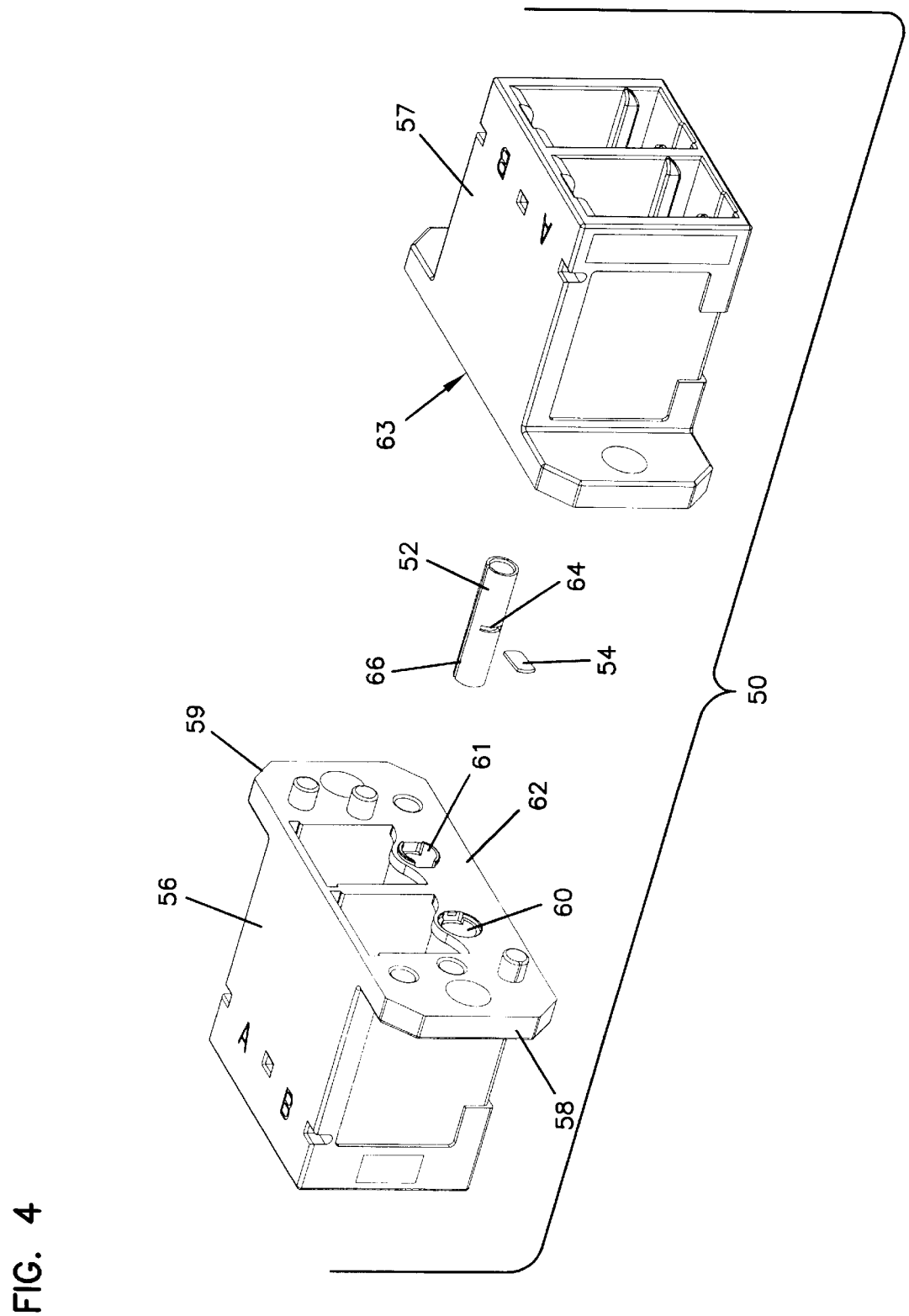
FIG. 4 shows an exploded perspective view of the adapter of FIG. 1.
Figure 5:
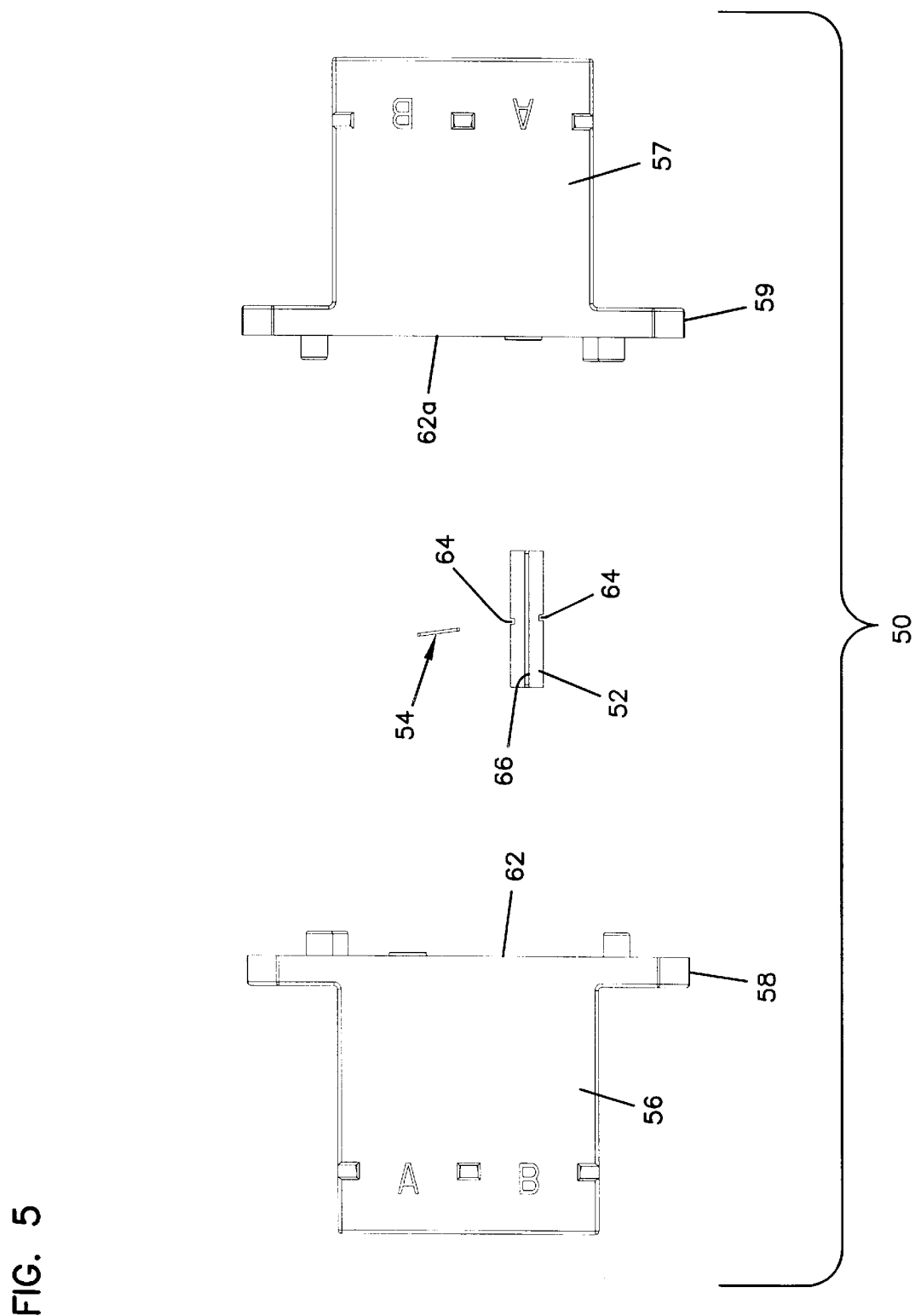
FIG. 5 shows an exploded side view of the adapter of FIG. 1.

Referring to FIG. 4, adapter 50 includes two housing halves 56 and 57 which are joined at flanges 58 and 59. Preferably, when housing halves 56 and 57 are joined, the part line between the housing halves 56 and 57 is ultrasonically welded or glued so that housing halves 56 and 57 form an inseparable and solid adapter 50. Adapters of this general style are known and the details of the design and construction have been disclosed in U.S. Pat. No. 5,883,995. The preferred embodiment of the present invention alters these known adapters through the addition of an attenuator 54 to split sleeve 52 prior to split sleeve 52 being inserted into openings 60 and 61 in face 62 of housing half 56, prior to the assembly of housing halves 56 and 57 to form adapter 50. Attenuator 54 is inserted in split sleeve 52 through slots 64 in split sleeve 52. Slots 64 are positioned on opposite sides of split sleeve 52. Split sleeve 52 defines a longitudinal opening or split 66 that runs the entire length of split sleeve 52, parallel to the longitudinal axis of the split sleeve. Alternative embodiments of this internal sleeve might not include such a longitudinal split or include a split of a different design, and still conform to the present invention. Slots 64 are positioned so that the center of slots 64 are approximately 90 degrees about the circumference from split 66. A line drawn connecting slots 64 across the axis of the split sleeve would approximately intersect the longitudinal midpoint of split sleeve 52. In the embodiment shown in FIG. 4, the slots 64 are longitudinally displaced along split sleeve 52 so that when attenuator 54 is inserted through slots 64, attenuator 54 lies at a non-perpendicular angle, such as eight degrees from perpendicular to the longitudinal axis of the split sleeve. Other non-perpendicular angles are possible. A perpendicular arrangement of the attenuator is also possible, if desired.

APC polish connectors have a standard orientation and degree to the angle of polish of the fiber end 16. As shown in FIG. 3, viewed from the top of adapter 10, the angle of polish for an APC connector makes an angle A equal to 98 degrees with respect to the centerline of optical fiber 12. To ensure that the angle and orientation of attenuator 54 matches the angle and orientation of polished face of fiber end 16, the rotational orientation of split sleeve 52 relative to adapter halves 56 and 57 must be maintained. Openings 60 and 61 for receiving split sleeve 52 are shaped to hold the attenuator at the desired angle of eight degrees in this embodiment for APC connectors, and prevent split sleeve 52 and attenuator 54 from rotating once the split sleeve/attenuator combination is inserted into the adapter halves 56 and 57 and flanges 58 and 59 are welded or glued together.

Figure 6:
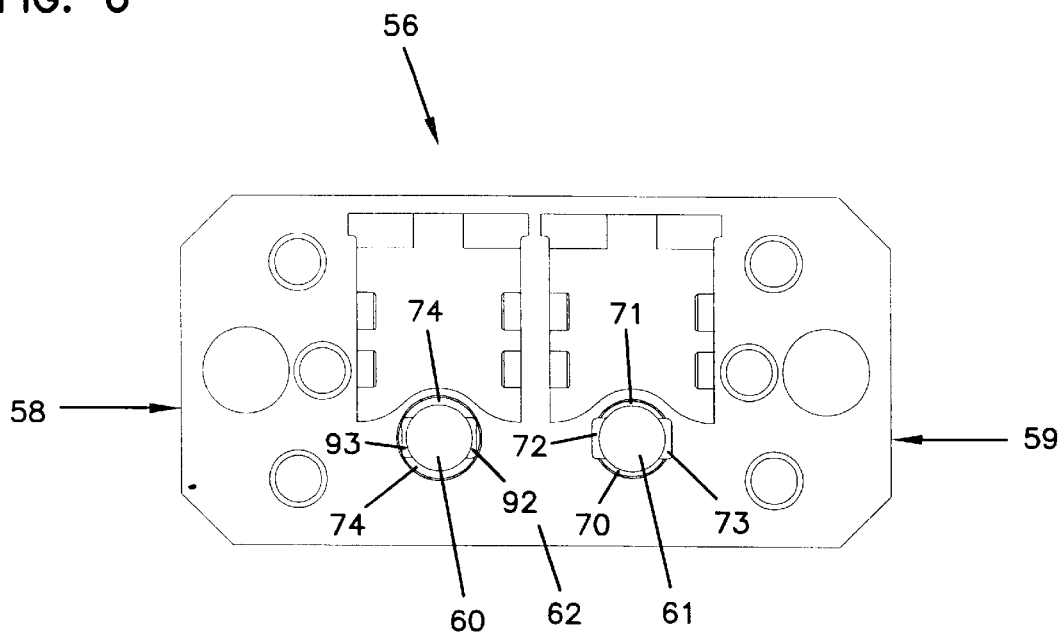
FIG. 6 shows an end view of the mating face of one of the mating adapter housing parts of FIG. 4.
Figure 7:
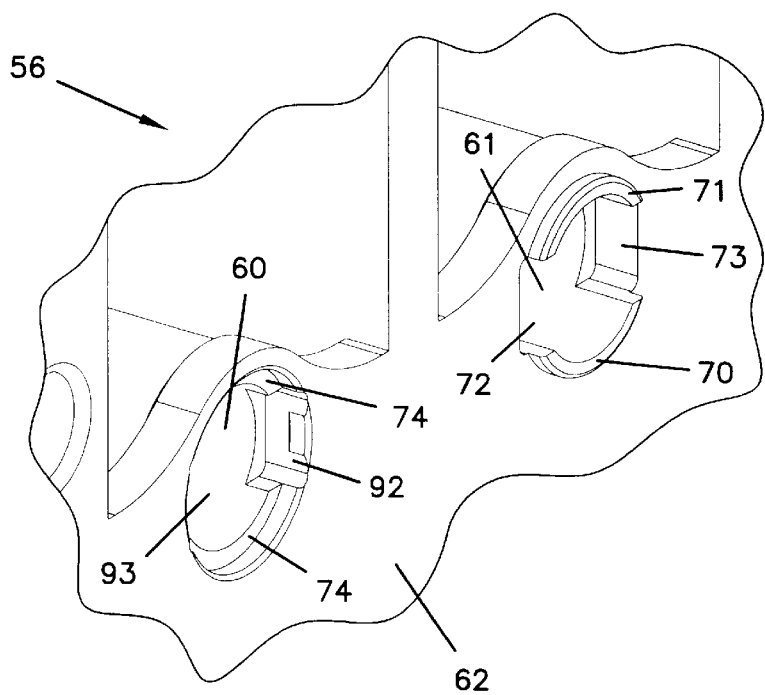
FIG. 7 is a detail view showing the openings and pockets in the mating face of the adapter housing part for the adapter shown in FIG. 4.
Figure 8:
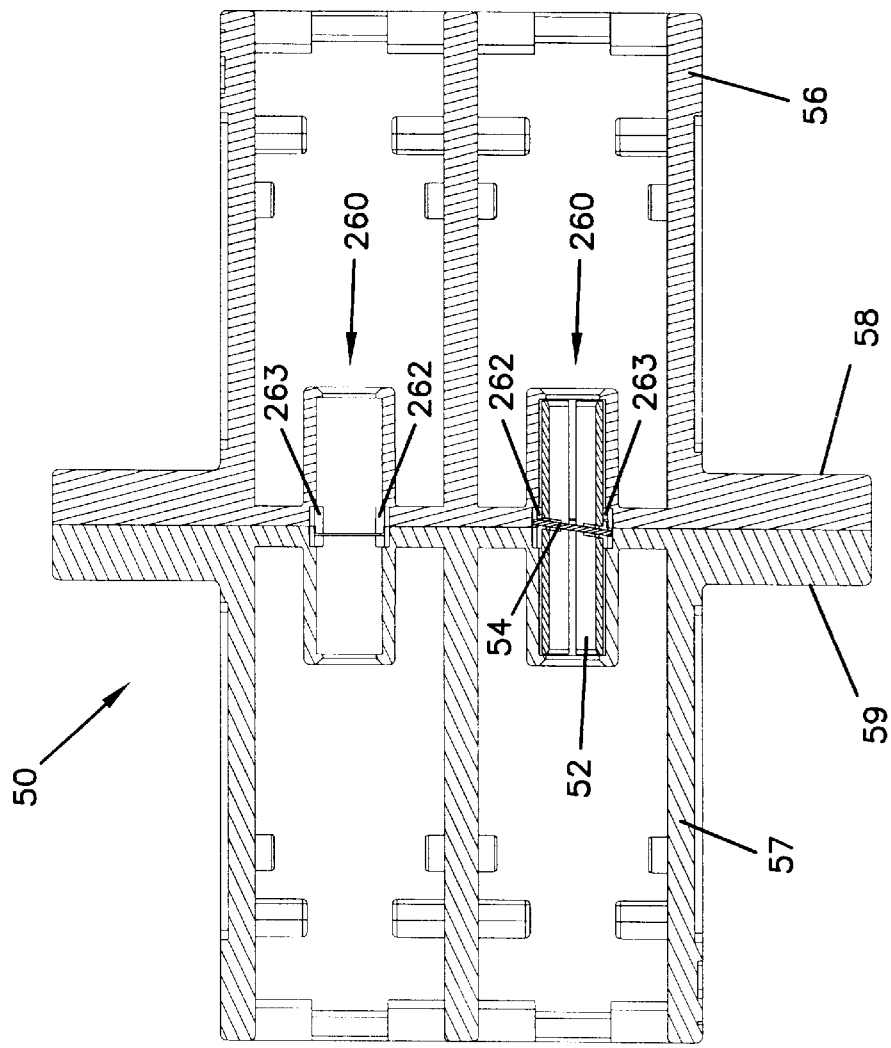
FIG. 8 shows a cross-sectional view of the adapter of FIG. 2, taken along the axis of the sleeve at line AA with only one sleeve in place.
Figure 10:
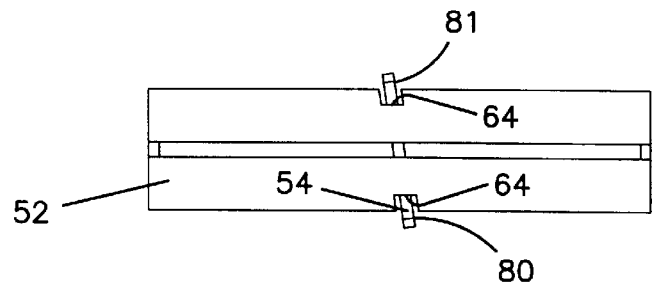
FIG. 10 is a top view of the sleeve with the attenuator inserted.

Referring now to FIGS. 6, 7 and 10, details of how the orientation of sleeve 52 and attenuator 54 are maintained are shown. For clarity in this discussion, only one housing half 56 will be referred to, although it is expressly stated that an assembled adapter 50 will include two identical housing halves 56 and 57. When attenuator 54 is inserted into sleeve 52 through slots 64, attenuator ends 80 and 81 extend beyond outer wall 82 of sleeve 52. These extension 80 and 81 project into gaps 72 and 73, which lie on opposite sides of opening 61 in mating face 62, and gaps 92 and 93, which lie on opposite sides of opening 60. During assembly, two identical housing halves 56 and 57 are assembled to form an adapter 50, opening 61 of housing half 56 is aligled with opening 61 of housing half 57, forming a continuous opening 260 through adapter 50. Captively held within opening 260 are sleeve 52 and attenuator 54. Gaps 72 and 73 of opening 61 and gaps 92 and 93 of opening 60 are sized and positioned so that when housing halves 56 and 57 are assembled gaps 72 and 92 combine to form a single gap 262 in opening 260, and gaps 73 and 93 combine to form a single gap 263 in opening 260. Extensions 80 and 81 of attenuator 54 project beyond outer wall 82 of sleeve 52 and are received by gaps 262 and 263 in adapter 50. Gaps 262 and 263 are sized and shaped to prevent movement of extensions 80 and 81, thus holding the rotational orientation of sleeve 52 and attenuator 54 within adapter 50. Upper and lower extensions 70 and 71 of opening 61 are shaped to extend into an annular shelf 74 in opening 60 when two housing halves 56 and 57 are assembled such faces 62 and 63 are flush with each other.

The magnitude of the angle attenuator 54 makes with the longitudinal axis of the sleeve is maintained by the longitudinal offset of slots 64 in split sleeve 52. If an angle of 90 degrees is desired, slots 64 will be directly across from one another. If an angle other than perpendicular is desired, the slots may be offset toward opposite ends of the sleeve.

Figure 9:
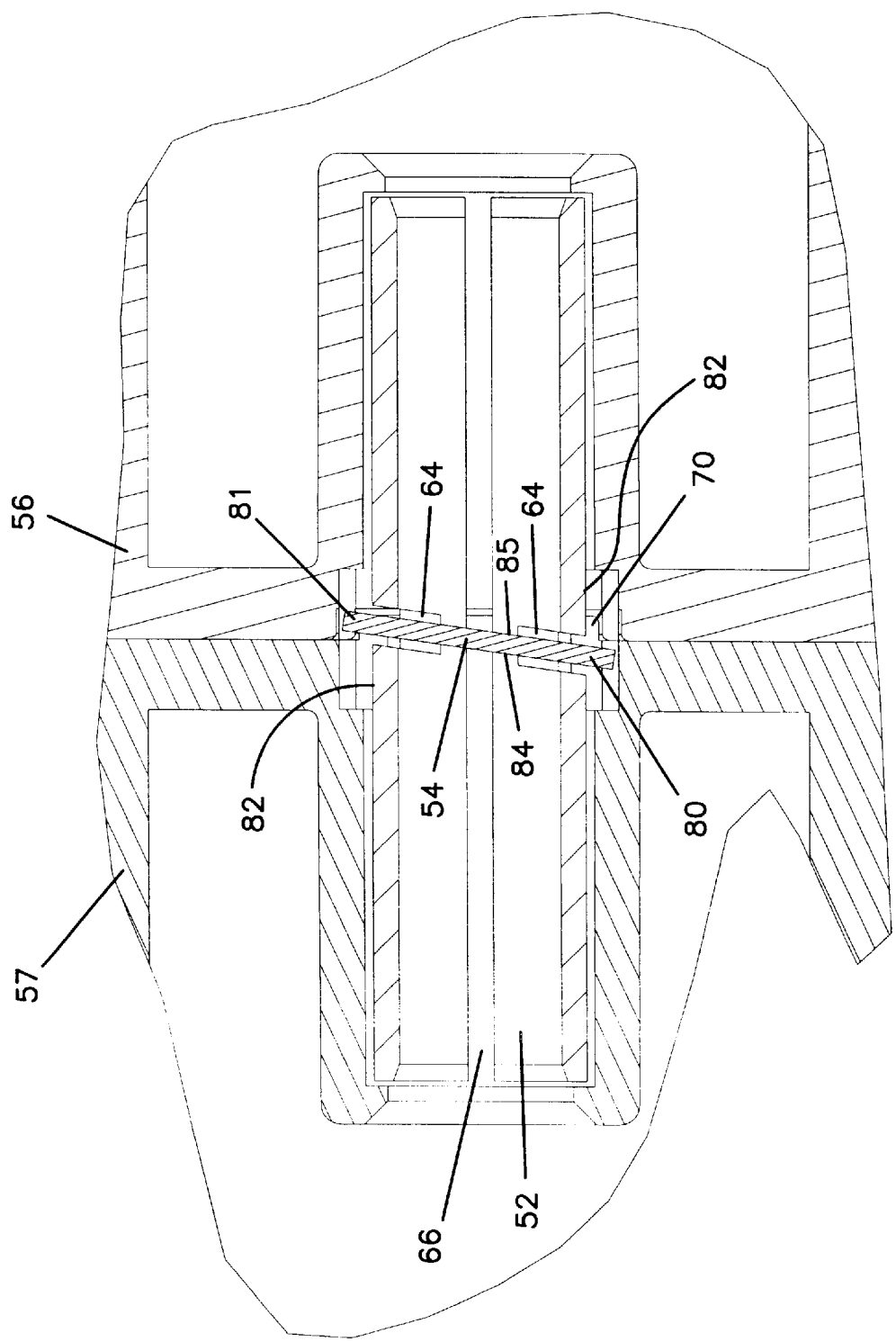
FIG. 9 shows the cross-sectional detail of the sleeve within the adapter shown in FIG. 8.

Also shown in FIG. 9 are the two faces 84 and 85 of attenuator 54. These faces are planar surfaces on opposite sides of attenuator 54 and each contacts the polished face 16 of connector 10 when connector 10 is inserted into adapter 50.

Figure 11:
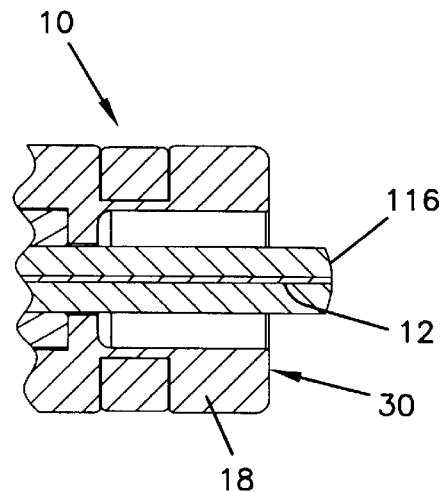
FIG. 11 is a view of the ferrule in FIG. 3, showing an alternative spherical end polish.

In the illustrated embodiment in FIGS. 1–10, the longitudinal offset of slots 64 is appropriate for holding attenuator 54 at eight degrees from perpendicular to the longitudinal axis of split sleeve 52 for use with APC polished connectors 12. Alternative embodiments include split sleeves without longitudinal offset so that the attenuator is held perpendicular to the longitudinal axis of the split sleeve for use with other planar or spherical polish small format connectors. A flat polish attenuator would have an angle A, as shown in FIG. 3, of 90 degrees. An example of an alternative ferrule end polish is shown in FIG. 11.

Figure 14:
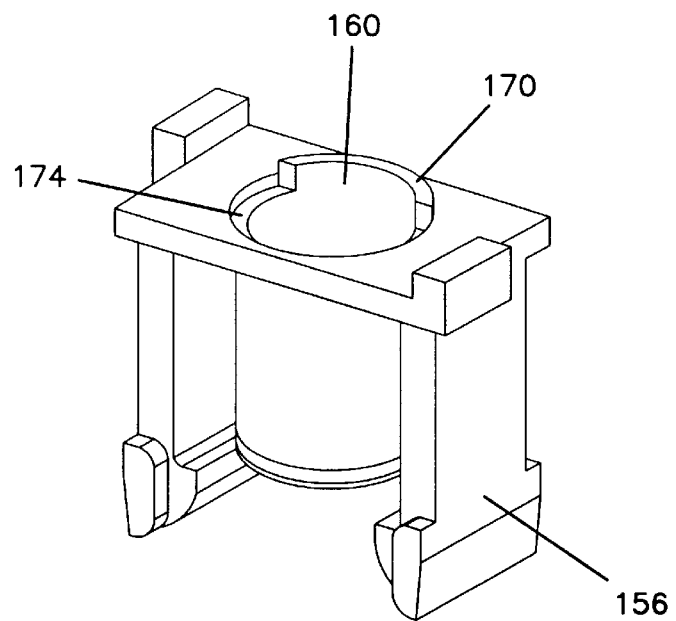
FIG. 14 is a detail perspective view of an insert half for the adapter shown in FIG. 12.
Figure 12:
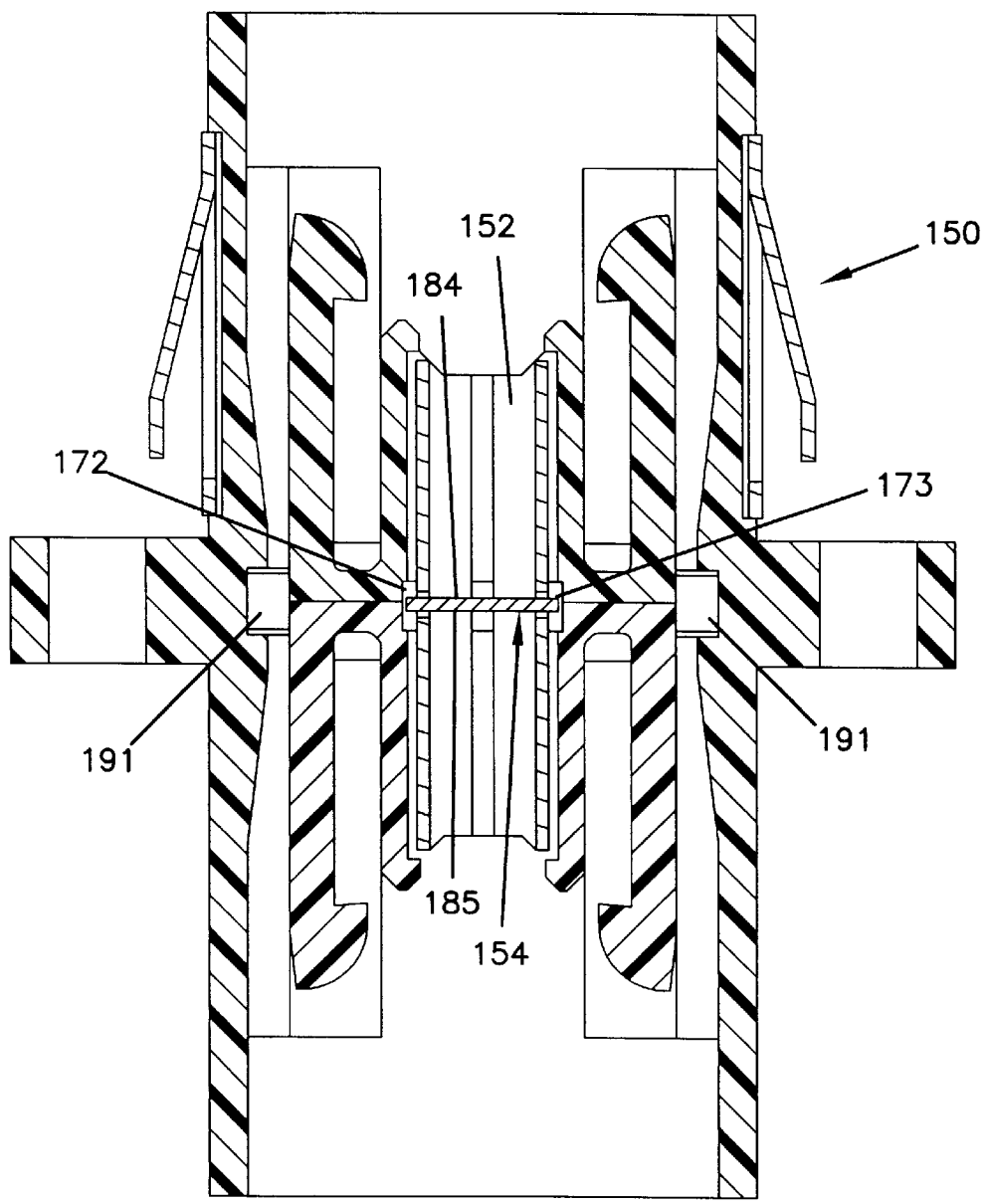
FIG. 12 shows a cross-sectional view of a second embodiment of an adapter with attenuator.
Figure 13:
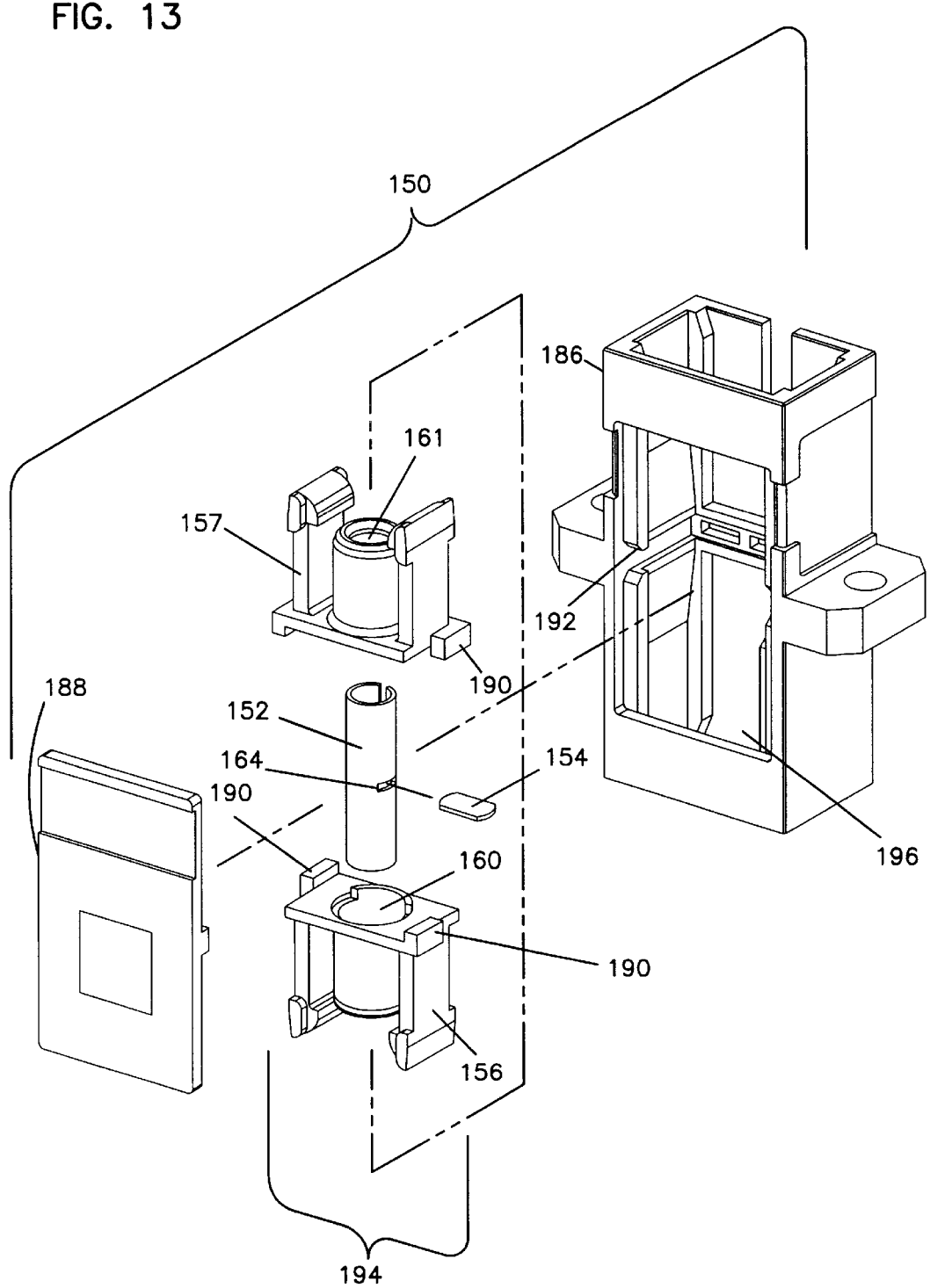
FIG. 13 shows an exploded perspective view of the adapter of FIG. 12.

In addition to various attenuator angles, the size and format of adapters conforming to this invention can be varied, such as in the alternative embodiment shown in FIGS. 12–14. In this embodiment, adapter 150 is a different format than adapter 50 and split sleeve 152 has slots 164 holding attenuator 154 perpendicular to the longitudinal axis of split sleeve 152. Split sleeve 152 and attenuator 154 are held rotationally fixed within adapter 150 by the cooperation of openings 160 and 161 in identical insert halves 156 and 157. An angled arrangement could also be used. Adapter 150 is an SC format adapter. Further details of adapter 150 are shown and described in U.S. Pat. No. 5,371,663, the disclosure of which is incorporated herein by reference. The departure from this prior art is in the incorporation of an attenuator within sleeve 152 of adapter 150.

Openings 160 and 161 include extension 170 on one side, and depression 174 on the opposite side, as shown in FIG. 14. Gaps 172 and 173 are defined within openings 160 and 161 when the insert halves are joined with insert faces 162 and 163 are touching as shown in FIG. 12. Gaps 172 and 173 cooperate with extensions of attenuator 154 beyond the outer circumference of split sleeve 152 to prevent the rotation of split sleeve 152 within inserts are joined as shown in FIG. 12. Adapter 150 includes split sleeve 152 holding attenuator 154 perpendicular to the longitudinal axis of split sleeve 152. Alternative embodiments of this invention allow the use of longitudinally offset slots 164 so that attenuator 154 is held within adapter 150 at an angle other than perpendicular to the longitudinal axis of split sleeve 152. An example of an alternative embodiment includes setting the attenuator at eight degrees from perpendicular to work with APC connectors. Also shown are the two faces 184 and 185 of attenuator 154. These faces are planar surfaces on opposite sides of attenuator 154 and each would contact the polished face of a mating connector when such a connector is inserted into adapter 150.

When insert halves 156 and 157 are assembled with attenuator 154 inserted through split sleeve 152 and split sleeve 152 inserted into openings 160 and 161, an assembly 194 is formed. Insert halves 156 and 157 include a flange half 190 on opposing sides. Flanges halves 190 cooperate to form flanges 191 when assembly 194 is formed. An adapter 150 is formed when flanges 191 of assembly 194 is slidably inserted into slot or channel 192 of main adapter housing 186 through opening 196 and cover 188 is placed over opening 196 and welded or glued to housing 186.

The invention as hereinabove described is adaptable to a variety of different fiber optic adapters which incorporate a sleeve or other cylindrical structure to align and ensure contact of the optical fiber ends to be connected. With the present invention, attenuators can be positioned within the adapter at angles appropriate for planar, spherical or angled polish fiber optic ends.

The above specification, examples and data provide a complete description of the design and use of the invention. Since many embodiments of the invention can be made without departing from the spirit and scope of the invention, the invention resides in the claims hereinafter appended.

What is claimed is:

1. A fiber optic adapter comprising:
   an adapter housing having a longitudinal opening extending from a first end into the housing, the first end sized for receiving a fiber optic connector;
   a sleeve positioned within the longitudinal opening of the housing for receiving a ferrule of the fiber optic connector, the sleeve having a sidewall defining two openings positioned on opposite sides of the sleeve;
   an optical signal altering element positioned within the sleeve and extending through the openings of the sidewall of the sleeve, the optical signal altering element including opposing ends extending beyond an outer diameter of the sleeve;
   the housing defining two pockets for receiving the ends of the optical signal altering element extending beyond the outer diameter of the sleeve, the pockets positioned on opposite sides of the longitudinal opening, wherein the pockets prevent the sleeve and the optical signal altering element from rotating within the housing about the longitudinal opening.

2. The fiber optic adapter of claim 1, wherein the optical signal altering element is configured for use with an angle polish fiber optic connector.

3. The fiber optic adapter of claim 1, wherein the optical signal altering element is configured for use with a flat polish fiber optic connector.

4. The fiber optic adapter of claim 1, wherein the optical signal altering element is configured for use with a spherical polish fiber optic connector.

5. A method for assembling a fiber optic adapter comprising the steps of:

provididing a first and second housing each with a longitudinal opening extending from a first end into the housing, the first end sized for receiving a fiber optic connector and a second end sized for receiving a sleeve, the sleeve defining a longitudinal axis for receiving a ferrule of the fiber optic connector, the sleeve having a first end and a second end on opposite ends of the longitudinal axis, and a sidewall defining two openings positioned on opposite sides of the sleeve;

inserting an optical signal altering element through the openings in the sidewall of the sleeve wherein the optical signal altering element includes opposing ends and the opposing ends of the optical signal altering element extend through the openings beyond the sidewall of the sleeve;

inserting the first end of the sleeve with the optical signal altering element in place into the longitudinal opening of the first housing and inserting the second end of the sleeve into the longitudinal opening of the second housing, so that each opposing end of the optical signal altering element enters a pocket defined by the first housing and the second housing and prevents the sleeve from rotating within the longitudinal opening; and mounting the first housing to the second housing.

6. The method of claim 5, wherein the first housing and the second housing each include a flange, and the flange of the first housing is attached to the flange of the second housing when the first housing is mounted to the second housing.

7. The method of claim 5, wherein the first housing and the second housing each include a flange slidably inserted into a channel of a main adapter housing through an opening in the main adapter housing, and an adapter cover is placed over the opening in the main adapter housing.

8. A fiber optic adapter for altering an optical telecommunications signal comprising:

a housing defining a longitudinal axis and an opening extending at an angle to the longitudinal axis;

means within the housing for receiving a first ferrule from a first fiber optic connector and a second ferrule of a second fiber optic connector so that an optical fiber within the first ferrule is aligned with an optical fiber of the second ferrule along the longitudinal axis for transmission of optical signals;

means for altering an optical signal from the optical fiber of the first ferrule before the signal is received by the optical fiber of the second ferrule;

wherein the means for altering the optical signal is positioned within the means for receiving the first and second ferrule and extends into the opening in the housing to rotatably fix both means within the housing.

* * * * *